P. P. GROSSO.
TIRE CONSTRUCTION.
APPLICATION FILED DEC. 13, 1921.
1,411,915.
Patented Apr. 4, 1922.
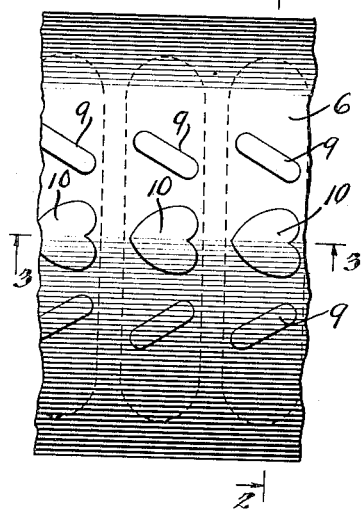
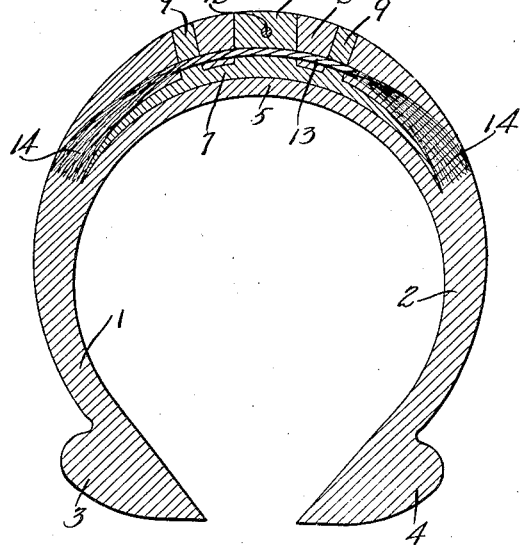
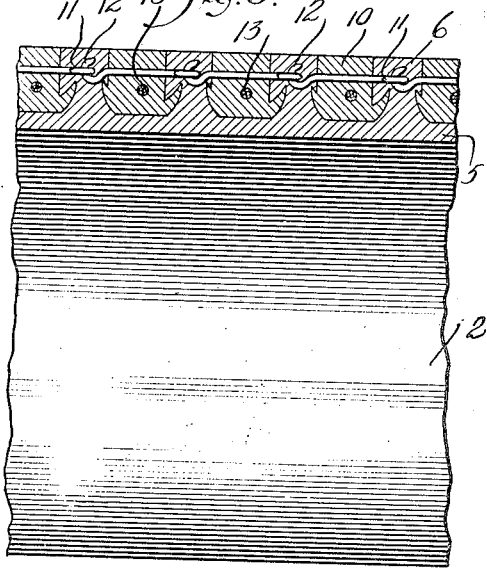
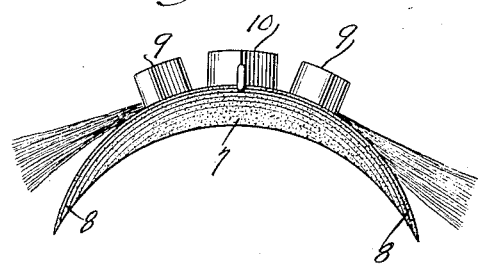
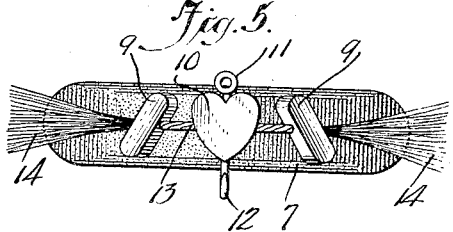
INVENTOR
PATRICK P. GROSSO
BY
ATTORNEYS

UNITED STATES PATENT OFFICE.

PATRICK P. GROSSO, OF BROOKLYN, NEW YORK.

TIRE CONSTRUCTION.

1,411,915.  Specification of Letters Patent.  Patented Apr. 4, 1922.

Application filed December 13, 1921. Serial No. 522,082.

*To all whom it may concern:*

Be it known that I, PATRICK P. GROSSO, a citizen of the United States, and a resident of the city of New York, borough of Brooklyn, in the county of Kings and State of New York, have invented a new and Improved Tire Construction, of which the following is a full, clear, and exact description.

This invention relates to a tire construction, and has particular reference to means for improving the construction of an automobile tire shoe.

An object of the invention resides in the provision of means whereby the shoe is rendered punctureproof, non-skidding, and by means of which the life of the tire is greatly enhanced.

Another object resides in the provision of means whereby the tread surface of the shoe may be effectively armored; not only against puncture but against rapid wear of the surface, this same means being efficient to prement the tire from skidding.

A further object resides in the particular construction and arrangement of parts which are hereinafter described and claimed and shown in the accompanying drawings.

The invention is illustrated in the drawings, of which—

Figure 1 is a plan view of a portion of the shoe.

Fig. 2 is a section taken on the line 2—2 of Fig. 1.

Fig. 3 is a section taken on the line 3—3 of Fig. 1.

Fig. 4 is a side view of one of the bands forming part of the means for rendering the tire punctureproof.

Fig. 5 is a plan view of the same band.

The form of invention shown in the drawing is a preferred application of the invention, although it is understood that modifications in the construction and arrangement of the parts and in the character of the materials used may be adopted without departing from the spirit of the invention.

The invention is particularly applicable to an automobile tire shoe having side walls 1 and 2, bead portions 3 and 4 and a tread portion 5, preferably of fabric, the outer surface of which is provided with a layer of rubber such as 6. It is the purpose of my invention to cause to be imbedded in this outer layer of rubber, along the peripheral surface of the tread, a plurality of bands 7 of any suitable material. These bands preferably are made of some flexible material, such as a very hard fiber, leather, or they made be formed by a plurality of thin sheets of material of the proper shape. It will be noted that the surfaces of these bands are coarsened or roughened so as to permit their more effective incorporation in the rubber in which they are imbedded. The material of which these bands are made can very easily be molded or cast in the proper shape, facilitating their manufacture. The outer surfaces of these bands are also transversely concave, the outer edges being roughened so that objects penetrating through the rubber have a tendency to be deflected toward the center of the band, which is very durable. It will be noted that each of these bands is curved to conform to the curvature of the tread of the shoe, and their outer ends are tapered as shown at 8. The upper outer surface of the bands is provided with a plurality of knobs such as 9 and 10 of any suitable material, preferably of the same material of which the bands are formed. These knobs may be of any suitable shape or size but are preferably of sufficient depth so that when the bands are embedded in the rubber along the outer surface of the tread the upper surface of the knobs will lie flush with the surface of the tread to act as resisters of wear on the tread and also to prevent skidding.

The bands are molded in the rubber portion 6 of the tread in any suitable manner and are placed closely adjacent each other and adapted to be flexibly connected. The flexible connection shown, which is a preferred form of the connection used, comprises a wire link passing through one of the knobs, such as 10, one end of which is formed with an eye 11 and the other end of which is formed with a hook 12. The hook of one connection will engage with the eye of the adjacent connection, as shown in Figure 3, so as to hold the bands in the proper relative position and yet permit a certain flexible movement therebetween. Considering the group of knobs on each band, they are each provided with apertures through which a connection or cord such as 13 is passed. The outer opposite ends of the cord or cable 13 are unravelled and extend in a fanlike form, designated by the numeral 14. By fanning out the ends of this cord or cable laterally of each band, the embedding of the bands in the rubber layer 6 is made much more effective.

The knobs 9 and 10, preferably, on the average-sized tire are raised above the bands approximately three-quarters of an inch, and the bands extend transversely across the tread about one-quarter of the circumference of the tire.

It will thus be seen that I have provided a simple, strong construction which can be very readily formed on any shoe, which increases the life of the shoe and makes it substantially punctureproof and non-skidding.

What I claim is:

1. An automobile tire shoe construction which comprises a tread portion, a plurality of flexible bands of relatively hard material embedded in said tread portion adjacent each other, flexible link connections adjacent said bands, and a reenforcing element on each band extending laterally in opposite directions therefrom into the tread portion, the ends of the element being fanned out to enhance the embodiment of the bands in the tread portion.

2. An automobile tire shoe construction which comprises a tread portion, a plurality of flexible bands of relatively hard material embedded in said tread portion adjacent each other, a plurality of knobs on each band, the upper surfaces of which lie flush with the surface of the tread portion, flexible means connecting adjacent bands, and laterally extending reenforcing means on each band, the ends of said reenforcing means being fanned out to enhance the embodiment of each band in the tread portion.

3. An automobile tire construction which comprises a tread portion, a flexible band of relatively hard material embedded in said tread portion, and a reinforcing element extending outwardly from said band to be embedded in the material of the tread portion, said reinforcing element being spread out as it extends from the band to enhance the embodiment of the band in the tread portion.

4. An automobile tire construction which comprises a tread portion, a flexible band of relatively hard material embedded in said tread portion, and a strand of thread or twine extending from the band into the tread portion, the ends of the strand being fanned out to enhance the embodiment of the band in the tread portion.

5. An automobile tire construction which comprises a flexible, curved band of relatively hard material embedded transversely of the tire in the tread portion thereof, the outer surface of this band being transversely concavely curved so that any element striking the outer surface of the band will be deflected toward the center of the band rather than away from the band to puncture through the tread and cut the tire.

6. An automobile tire construction which comprises a flexible curved band of relatively hard material embedded transversely across the tire and the tread portion thereof, and a strand of twine or cord extending from the band and fanned out to enhance the embodiment of the band in the tread portion.

7. An automobile tire construction which comprises a flexible curved band of relatively hard material embedded transversely across the tire and the tread portion thereof, a strand of twine or cord extending from the band and fanned out to enhance the embodiment of the band in the tread portion, and a plurality of integral knobs formed on the outer surface of the band, the outer edges of the knobs to be flush with the tread surface to act as anti-skid devices.

PATRICK P. GROSSO.